United States Patent
Daily et al.

(10) Patent No.: US 7,315,241 B1
(45) Date of Patent: Jan. 1, 2008

(54) ENHANCED PERCEPTION LIGHTING

(75) Inventors: Mike Daily, Thousand Oaks, CA (US);
Ron Azuma, Santa Monica, CA (US);
Chris Furmanaki, Piedmont, CA (US)

(73) Assignee: HRL Laboratories, LLC, Malibu, CA (US)

( * ) Notice: Subject to any disclaimer, the term of this patent is extended or adjusted under 35 U.S.C. 154(b) by 221 days.

(21) Appl. No.: 11/002,877

(22) Filed: Dec. 1, 2004

(51) Int. Cl.
*G08B 25/00* (2006.01)

(52) U.S. Cl. ............... 340/525; 340/524; 340/554; 340/555; 340/556; 340/557; 340/332

(58) Field of Classification Search ............ 340/525, 340/524, 901, 903, 933, 942, 554, 555, 556, 340/557, 552
See application file for complete search history.

(56) References Cited

U.S. PATENT DOCUMENTS

| | | | |
|---|---|---|---|
| 4,131,345 A | 12/1978 | Carollo | |
| 4,493,064 A * | 1/1985 | Odero et al. | 367/92 |
| 5,040,007 A | 8/1991 | Hagiuda | |
| 5,410,345 A * | 4/1995 | Eichenlaub | 348/59 |
| 5,781,243 A | 7/1998 | Kormos | |
| 6,055,214 A * | 4/2000 | Wilk | 367/99 |
| 6,163,755 A | 12/2000 | Peer et al. | |
| 6,226,003 B1 * | 5/2001 | Akeley | 345/419 |
| 6,288,974 B1 * | 9/2001 | Nelson | 367/135 |
| 6,341,884 B1 | 1/2002 | Leleve et al. | |
| 6,420,977 B1 | 7/2002 | Corbitt et al. | |
| 6,429,429 B1 | 8/2002 | Fohl et al. | |
| 6,549,122 B2 * | 4/2003 | Depta | 340/407.1 |
| 6,935,763 B2 * | 8/2005 | Mueller et al. | 362/276 |

OTHER PUBLICATIONS www.stetten.com/george/rttr/.
www.laser-magic.com/equipment3.html.
www.studiobbb.com.
www.internatlaser.com/.
http://www.visteon.com/utils/whitepapers/2002_01_1989.pdf.
http://www.visteon.com/utils/whitepapers/2002_01_0381.pdf.
http://www.visteon.com/utils/whitepapers/2002_01_0379.pdf.
www.just-auto.com/features_detail.asp?art=439&c=1.

(Continued)

*Primary Examiner*—Daryl C Pope
(74) *Attorney, Agent, or Firm*—Tope-McKay & Associates

(57) ABSTRACT

The present invention relates to an enhanced perception lighting (EPL) system for providing enhanced perception of a user's physical environment. The EPL system comprises a sensor module for detecting and sampling a physical aspect from at least one point in a physical environment and for generating an observation signal based on the physical aspect; a processor module coupled with the sensor module for receiving the observation signal, processing the observation signal, and generating an output signal based on the observation signal; and a projection display module located proximate the sensor module and communicatively connected with the processor module for projecting a display onto the at least one point in the physical environment based upon the output signal. The system allows a user to gather information from the physical environment and project that information onto the physical environment to provide the user with an enhanced perception of the physical environment.

62 Claims, 7 Drawing Sheets

OTHER PUBLICATIONS www.reflecto.co.uk/products_active.html.
http://www.car.kak.net/modules.php?op=modload&name=news&file=article&sid=575&mode=thread&order=0&thold=0.
http://www.car.kak.net/modules.php?op=modload&name=news&file=article&sid=561.
www.gtri.gatech.edu/res-news/SPFlash.htm.

* cited by examiner

FIG. 3A
FIG. 3B
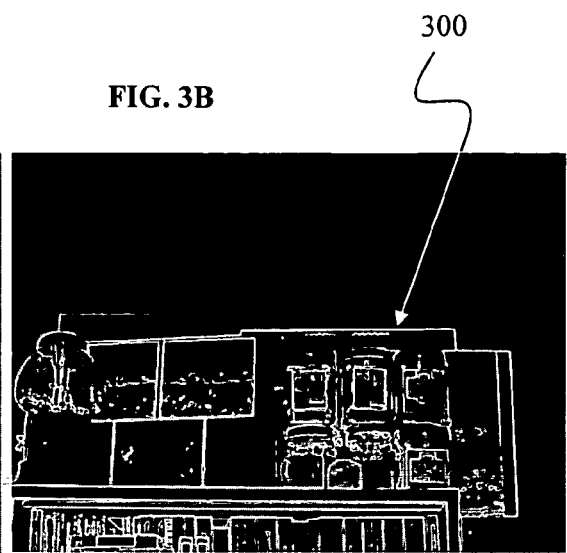
300
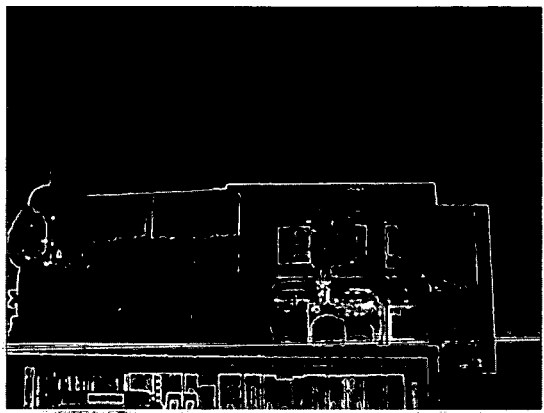
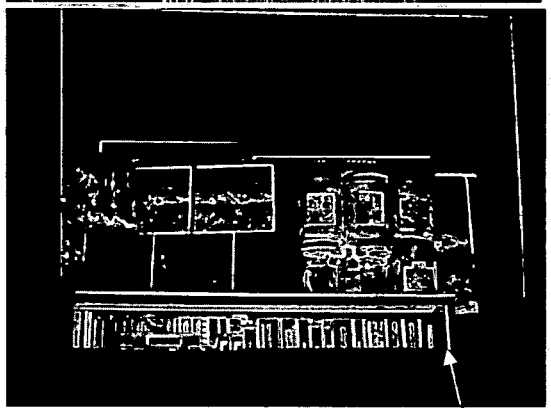
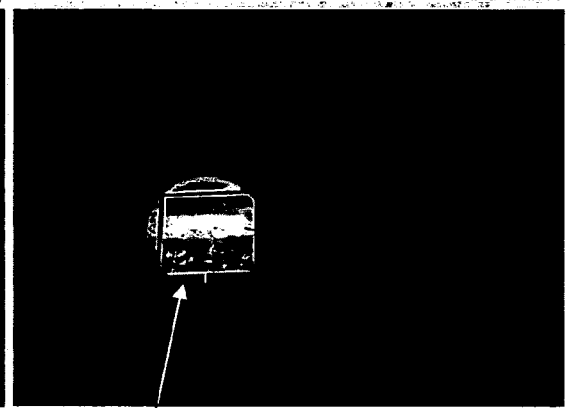
FIG. 3C
300
302
FIG. 3D

| Function | Sensor | Processor | Display | Notes |
|---|---|---|---|---|
| Portable luggage x-ray | X-ray | Desktop | Raster | |
| Surface Temperature Imager | IR | Handheld | Numeric value imager | Wherever you point it, a temperature appears for the surface |
| In-wall wire detector | Magnetometer | Handheld | Vector Laser | |
| Scent localizers | Olfactory | Handheld | Raster or Vector | |
| Flashlight | IR, LLCCD, or II | Handheld | Raster | Illuminates only features or objects in local environment |
| Car headlights | IR, LLCCD | In-vehicle | Vector Laser | Highlights non-visible occluded (fog, darkness) obstacles and features |
| Street lamps | Motion, IR | Embedded or remote | Raster | Illuminates local features in front of pedestrians |
| Indoor lighting | LLCCD | Embedded or remote | Raster or Vector | Obstacles, effects |
| Outdoor perimeter security lights | IR, Motion | Embedded or remote | Raster | Bright illumination on moving, hot objects only |
| "Predictive" lighting | CCD | Desktop | Raster | Alters environment to look like a selected model |
| Stove Temp. Imager | IR | Embedded | Raster | Colored light corresponds to heat on a surface |
| Sun burn detector | UV | Embedded | Raster or numeric | Highlights areas that reflect UV |
| Sound/speech localizer for the deaf | Audio Tracker | Desktop or embedded | Raster | NLU/speech to text, Project words and sounds from objects that made them |
| Shallow H20 terrain viz | Sonar/GPS | | Rasterized laser | For small craft navigation in shallows |
| Night/Fog terrain viz | Radar/GPS | Integrate database | Rasterized laser; Colored light | For small craft nav at night or in fog |

FIG. 9

ENHANCED PERCEPTION LIGHTING

FIELD OF INVENTION

The present invention relates to enhanced perception lighting and, more particularly, to a system that allows a user to gather information from a physical environment and project that information back onto the physical environment in order to provide the user with an enhanced perception of the physical environment.

BACKGROUND OF INVENTION

Light is often used in order for an individual to see a surrounding environment. While sunlight provides an illuminated environment, several situations exist where sunlight is not available or may not be desirable. In such situations, some form of illumination or vision enhancing device is necessary. For example, candles, light bulbs, and flashlights have been historically used as illumination devices. Conversely, night vision goggles and other infrared devices have typically fulfilled the need for a vision enhancement/imaging device. As technology has advanced, an increasing number of methods and devices for viewing our environment have been developed.

(1) Heads Up Display (HUD)/Head Mounted Display (HMD) Approaches

In order for a user to view a surrounding environment, several HUD and HMD tools have been devised. For Example, the University of Pittsburgh has devised a sonic flashlight for blending ultrasound images with physical objects such as a human hand. An ultrasound transducer illuminates the object. A display is used on the opposite side of a half silvered (translucent) mirror from the transducer and reflects an optical image onto the object. This relies on precise geometric relationships amongst the ultrasound slice being scanned, the monitor displaying the slice, and the mirror. However, the University of Pittsburgh device does not contemplate using the world as a display surface.

Traditional HUD-based display of night vision imagery performs no processing on the image to enhance perception and does not project the image onto the environment of the user, but rather onto the optical elements that make up the HUD. Traditional "video see-thru" Augmented Reality systems are similar in that they use a sensor, typically a charge coupled device (CCD) camera, to capture images of the local environment and then display those images on a head worn display. This requires sophisticated tracking systems to be worn by the user and does not anticipate using the world around the user to project information.

Furthermore, there are two projective HMD systems that have been developed in research labs. One is from Susumu Tachi's group, and the other from Jannick Rolland and Hong Hua at the University of Central Florida. Both systems have the user wear a projector on his head. The projector illuminates parts of the environment covered in retro-reflective material, so the projection bounces directly back to the user's eyes. However, the projector is not bright enough to work without the retro-reflective surface and the ambient brightness must be low. In one demonstration, the Central Florida system has a separate optical tracker measuring the locations of "Go" pieces on a "Go" board. The system can then augment the real board with virtual "Go" pieces. However, these approaches require external head trackers and do not capture a video image of the real environment through a head-worn video camera nor do they process and project such an image.

(2) Projection Systems/Lighting

Projection and lighting systems have been employed to illuminate an environment. For example, handheld devices with portable projectors are made by several companies. The portable projectors are not integrated with any sensing or processing means and do not supply sufficiently focused light output to be used in environmental projection.

As another example, Oregon Scientific, located at 19861 SW 95$^{th}$ Place, Tualatin, Oreg. 97062, sells a projection alarm clock (Model Number: RM-313) that automatically synchronizes to the United States (US) Atomic Clock and then projects the time in bright red light on a ceiling surface. Although the system possesses the means to sense the US Atomic Clock signal, process it, and display it onto the environment, it does not offer any capability to generate a display of perception enhancing information.

Additionally, a company named "Image Projection", located at 1109 Ponce de Leon blvd, Coral Gables, Fla. 33134, uses powerful light projection systems to project light images onto projection mediums, ranging from specially crafted projection surfaces to the retail products themselves for advertising. They sell projection systems that use static images (called "gobos") with optics and bright lights, including a small low voltage projector (3 in×2 in). Although, the product uses a projector to project an image, the product does not include any means to sense and process a local physical environment.

Projection technology has been employed in the construction industry in equipment containing rudimentary capabilities for sensing and displaying limited information. For example, a self-leveling plumb line (the Laser Vision Plumb Pyramid) made by Zircon, located at 1580 Dell Ave., Campbell, Calif. 95008, projects a vertical line onto a wall and will compensate for up to five (5) degrees out of level. Similar tools for finding wall studs and displaying the location on light emitting diodes (LEDs) on the tool also exist. These systems do not contemplate the registration of information with environmental features and do not offer the means to generalize their capability.

Furthermore, the Massachusetts Institute of Technology (MIT) Media lab has done ongoing work in the area of "personal projectors" which focuses on the development of small, low power, hand-held devices that can project information onto surfaces. These personal projectors do not contemplate the use of sensor input or registered projection to enhance perception in their concepts. MIT also describes work in the development of "ambient displays or fixtures" that use the physical environment for display of information. However, their approach does not contemplate enhanced perception and only provides architectural and aesthetic display of information (e.g. a "water lamp" that projects raindrops on the surface of still water). Other Media Lab projects have used projectors as part of interactive games, but without attempting to enhance perception with registered projection of sensed imagery or data.

(3) Laser Lighting/Vector Display

Laser lighting displays used for events such as rock concerts offer the means to project predetermined patterns from a processor into the environment of the audience (typically on smoke in the air). However, the laser lighting displays do not project sensor data onto the environment using laser systems as vector displays. Also, rock concert laser light shows are typically not eye safe (must be no more than 1 Milliwatt) in the manner needed for the present invention.

(4) Structured Light

Structured light sensing uses a light projection system to project a known pattern onto an object. The pattern distorts depending on the shape and depth of the object and using a normal charge-coupled device (CCD) camera, algorithms can capture the three-dimensional (3D) geometry of the object.

Ferreira, Lobo, and Dias describe a handheld scanner using structured light projection called the tele-3D, which aims to produce 3D surfaces for small objects. Rocchini, Cignoni, Montani, Pingi, and Scopigno, ("A low cost 3D scanner based on structured light," Eurographics 2001, Vol. 20, Number 3) describe a low cost scanner using color-striped patterns to acquire a 3D model of a small artifact. These systems and many more like them are only used in the capacity to determine 3D depth from a scene.

Researchers at the University of North Carolina (UNC) (Raskar, Fuchs, Welch, Lake, and Cutts: 3D Talking Heads: Image Based Modeling at Interactive Rates Using Structured Light Projection) have developed systems that project imperceptible structured light onto surfaces to determine their 3D shape and then project an image onto the surface. More recently, UNC researchers (Raskar, Welch, Cutts, Lake, Stesin, Fuchs, "The Office of the Future: A Unified Approach to Image-Based Modeling and Spatially Immersive Displays," SIGGRAPH 98) describe a system that uses structured light (potentially imperceptible) to capture depth per pixel, then project images onto the 3D surfaces with correct geometry. The system is auto-calibrating in that it does not require the user to describe the geometry of the display areas prior to projecting imagery. The projector is used for both scanning the surfaces of the environment (using structured light) and for display. However, this system does not anticipate use of the environment for arbitrary display of information from sensors for the purpose of enhanced perception.

(5) Intelligent Headlights/Flashlights/Environmental Lights

Intelligent headlight can be used to adjust the direction of the beam (e.g. point around a corner), or at low speed may be used to make the beam short and wide, or alternatively, at high speed to make the beam narrow and longer. Additionally, some LED headlamps use more colors than conventional high intensity discharge (HID) (xenon) or halogen lights. However, these systems have minimal sensing (yaw or steering wheel turn) of the environment and project unstructured light without regard for specific features of the environment.

An example of an environmental light is an active road reflector. Active road reflectors use LEDs and are visible over 1000 M. However, they do not possess any sensing or processing means, but merely act as a static reflector.

In an attempt to provide a more adaptive lighting, Bavarian Motor Works (BMW), located at Chestnut Ridge Road, Woodcliff Lake, N.J. 07677, has proposed adaptive lighting that connects the driver with things like accelerator pedal push back, alertness assistance, parking assistance and lighting systems. More relevant is the BMW concept of "Pixel Light", which postulates the use of digital micro-mirror devices (DMD) projection technology to provide anti-dazzle permanent high beam illumination, bright Illumination of road markings, and navigation information on the road surface. However, this concept does not describe how to process, transform, and project information to enhance perception from sensors onto the roadway. Further, they do not address problems of tracking the car with precision to display information on the road surface in registration with features and do not address issues in projection of imagery with sufficient brightness to be visible under adverse conditions.

The following patents address similar capabilities.

U.S. Pat. No. 6,341,884, issued to Leleve, discloses a vehicle headlight that is capable of emitting different types of beams. This is a two-mode headlight for providing a cornering beam and a fog light beam.

U.S. Pat. No. 5,761,243, issued to Kornos, discloses display optimization for night vision enhancement systems as an apparatus for displaying an image from the night vision sensor in an aspect consistent with the horizontal field of view.

U.S. Pat. No. 6,420,977, issued to Corbitt, discloses video-monitoring safety systems and methods. The patent describes a system to present video images from a dangerous location to a driver upon arriving in proximity to the video camera.

U.S. Pat. No. 6,163,755, issued to Peer et al., discloses an obstacle detection system. The system is for detecting an obstacle from a sensor in a predetermined field of view and producing an avoidance signal. The patent was primarily designed for rail tracks.

U.S. Pat. No. 8,429,429, issued to Fohl et al., discloses a night vision system utilizing a diode laser illumination module and a method related thereto. The patent describes an active infrared illumination and detection system for improving night vision of obstacles in roads. However, there is no structured projection of information for enhanced perception onto the road surface and no processing of sensor information to extract relevant features.

As an example of a projector coupled with a microcomputer, Duracell's Watchdog intelligent flashlight has a built-in microcomputer that continuously monitors its batteries and guarantees that they will never go dead on you by automatically disabling the flashlight as soon as the voltage starts to drop. However, the flashlight has no means to sense the environment and does not project information for enhanced perception of the environment.

As another example of an intelligent flashlight, Sony sells an intelligent flashlight with its video recording equipment. The Sony flashlight is configured to deliver an appropriate amount of light for a given scene to be recorded.

U.S. Pat. No. 5,040,007, issued to Hagiuda, discloses an electronic flashlight apparatus for a camera. The flashlight, or flash, can optically direct light from the source in a different direction.

U.S. Pat. No. 4,131,345, issued to Carollo, discloses a visible light projection device. The device produces an image in a variety of angular orientations and sizes using servo controlled prisms.

(6) See-Through Sensors

Motion and Ranging Sensor (MARS) by Raytheon Company, located at 870 Winter Street, Waltham, Mass. 02451-1449, is a radar based system for locating people through walls. The system detects movement and can display the three-dimensional (3D) location of a person or object in several modes, including a plan view and perspective view. However, the system does not anticipate projection of information onto the environment and does not process the 3D sensor data for this purpose.

Another example of a see-through sensor is an ultra wide-band radar. Such a device is capable of detecting breathing up to twenty (20) feet away (through walls). The device then displays the resulting location of the person on a liquid-crystal display (LCD).

Additionally, Georgia Tech is currently pursuing a radar flashlight. The Georgia Tech Radar Flashlight is a flashlight-sized through-the-wall radar with a range of 40 ft. Once a human is detected through motions as small as heartbeats or respiration, the light flashes on a red LED on the handle to indicate that motion has occurred. However, it currently cannot be used while in motion (due to Doppler shifted signals).

As described above, several devices have been employed in order to allow a user to view a surrounding environment. However, each device has a fallback in that they do not sense, process, and project information to enhance a user's perception of an environment. Thus, a continuing need exists for a system that allows a user to gather information from a physical environment and project that information back onto the physical environment in order to provide the user with an enhanced perception of the environment.

SUMMARY OF INVENTION

The present invention relates to enhanced perception lighting and, more particularly, to a system for providing enhanced perception of a user's physical environment. The system comprises a processor module configured to receive an observation signal from a sensor module that detects and samples a physical aspect from at least one point in a physical environment. The processor module is operative to gather information about the physical aspect at the at least one point and generate an output signal based on the physical aspect. The processor module is further configured to be communicatively connected with a projection display module for projecting a display onto the at least one point in the physical environment based upon the output signal, whereby the system allows a user to gather information from the physical environment and project that information back onto the physical environment in order to provide the user with an enhanced perception of the physical environment.

The system further comprises a sensor module communicatively connected with the processor module for detecting and sampling a physical aspect from at least one point in a physical environment and for generating an observation signal based on the physical aspect.

Additionally, the system further comprises a projection display module located proximate the sensor module and communicatively connected with the processor module for projecting a display onto the at least one point in the physical environment based upon the output signal. The sensor module includes a digitizer for receiving analog data from a sensor and digitizing it into an image as the observation signal, the observation signal being thereafter fed into the processor module.

The sensor module is any point or imaging sensor, non-limiting examples of which include a radiation sensor, an image sensor, a motion and ranging sensor, an Ultra wideband radar, an X-ray sensor, an infrared sensor, a Magnetometer sensor, a chemical sensor, an Olfactory sensor, a low-light charge-coupled device (LLCCD) sensor, an image intensifier sensor, a charge-coupled device (CCD) sensor, an Ultra Violet sensor, an Audio sensor, a Sonar, a Radar, a Global Positioning Satellite, and a temperature sensor.

The processor module further includes a memory module for storing an observation signal received from the sensor module.

In another aspect, the processor module includes a feature extraction module for extracting salient features from the observation signal, whereby extracting the salient features enhances qualities of the observation signal, such as contrast, brightness and transparency. The feature extraction module is configured to perform at least one image processing function. The at least one image processing function is any image processing function, non-limiting examples of which include edge detection, high pass filtering in the Fourier domain, histogram equalization, homomorphic filtering, physics-based quantitative models, and figure ground segmentation. The figure ground segmentation is a technique selected from a group consisting of threshold, edges, regions, and connectivity preserving relaxation.

In yet another aspect, the processor module further includes an object recognition module for classifying an object present in the observation signal. The object recognition module is configured to employ any technique for recognizing an object, non-limiting examples of which include a model-based matching approach, learning vector-quantization, support vector machines, and fusion classifiers.

The processor module further includes a database module for storing information related to the observation signal in order to enhance functionality of the system.

Additionally, the processor module further includes a user interface module communicatively connected with the system for allowing a user to control the system.

In another aspect, the processor module further includes a renderer module for preparing information related to the observation signal, such as the features, segments, and objects, as an output signal for projection by the projection display module. The renderer module is configured to prepare at least one perceptual feature, non-limiting examples of which include dark adaptation, contract enhancement, stereoscopic depth, projected feature size at distances, motion compensation, and occluded information visualization.

Furthermore, the processor module includes a Field of View matching module for calibrating the system to enable accurate projection of information onto the environment to maximize registration of input and output fields of view.

In yet another aspect, the display projected by the projection display module is a display selected from a group consisting of vector and raster.

The system further comprises a network interface communicatively attached with the processor module, allowing the system to be communicatively connected with other devices.

In another aspect, the processor module is configured to receive an observation signal from an X-ray sensor. In this aspect, the processor module is operative to detect an object within a container and to generate an output signal based upon a location of the object within the container, whereby the system is configured to allow a user to point a device incorporating the system at a container, sense an object within the container and project onto an exterior surface of the container an image portraying the object within the container. The system further comprises an X-ray sensor communicatively connected with the processor module for detecting and sampling the object within the container, and for generating an observation signal based on the object. A projection display module is located proximate the X-ray sensor and communicatively connected with the processor module for receiving the output signal and projecting a display onto the exterior surface of the container.

In yet another aspect, processor module is configured to receive an observation signal from a thermal sensor and function as a surface temperature imager. In such an aspect, the processor module is operative to receive a user's preferred temperature limit, detect a surface temperature, and generate an output signal that is reflective of the surface temperature when the surface temperature exceeds a user's preset temperature limit, whereby the system is configured to allow a user to project a surface's temperature upon the surface. A thermal sensor is communicatively connected with the processor module for detecting and sampling a surface temperature from at least one point on the surface, and for generating an observation signal based on the surface temperature. A projection display module is located proximate the thermal sensor and communicatively connected with the processor module for receiving the output signal and projecting a display onto the at least one point on the surface based upon the output signal. The projection display module includes a plurality of display colors and is configured so that the display is projected in a plurality of colors, each color indicative of a particular temperature.

Additionally, the processor module is configured to receive an observation signal from a magnetometer and function as an in-wall wire detector. The processor module is operative to detect a location of a wire behind a wall surface and generate an output signal that is reflective of the location of the wire, whereby a user may point the device at a wall surface and project upon the wall surface an image at a location of a wire detected behind the surface. A magnetometer is communicatively connected with the processor module for detecting and sampling the location of a wire, and for generating an observation signal based on the location. A projection display module is located proximate the magnetometer and communicatively connected with the processor module for projecting a display onto the wall surface at the location of the wire.

In yet another aspect, the processor module is configured to receive an observation signal from a chemical sensor and function as a chemical localizer. In this aspect, the processor module is operative to detect a source of a chemical and generate an output signal reflective of the source, allowing a user to locate a chemical and project an image on the source of the chemical. Furthermore, a chemical sensor is communicatively connected with the processor module for detecting and sampling a chemical, and for generating an observation signal based on the chemical. A projection display module is located proximate the chemical sensor and communicatively connected with the processor module for projecting an image onto the source of the chemical.

Furthermore, the processor module is configured to receive an observation signal from a sensor selected from a group consisting of an infrared sensor, a low-light charge-coupled device sensor, a motion sensor, an ultra-violet sensor, a charge-coupled device sensor, a global positioning satellite, a sonar, a radar, and a image intensifier sensor. In this aspect, the processor module is operative to detect a feature in a local environment and generate an output signal based upon a location of the feature, whereby the system allows a user to locate and illuminate a feature in a local environment. The system further comprises a sensor selected from a group consisting of an infrared sensor, a low-light charge-coupled device sensor, a motion sensor, an ultra-violet sensor, a charge-coupled device sensor, a global positioning satellite, a sonar, a radar, and an image intensifier sensor. The sensor is communicatively connected with the processor module for detecting and sampling a feature in the local environment, and for generating an observation signal based on the feature. A projection display module is located proximate the sensor and communicatively connected with the processor module for receiving the output signal and for projecting an image onto the feature.

Furthermore, the system is configured to function as a handheld flashlight, allowing a user to point the handheld flashlight and illuminate the feature.

In another aspect, the system is incorporated into a vehicle and is configured to function as a car's headlight.

In yet another aspect, the system is configured to function as a street lamp, the system being operative to illuminate a feature proximate a pedestrian.

Additionally, the system is configured to function as indoor lighting, the system being operative to illuminate indoor, pre-designated features.

Furthermore, the system is configured to function as an outdoor security light, the system being operative to pinpoint and illuminate moving objects within a range of view of the security light.

In another aspect, the system is configured to function as predictive lighting. In this aspect, the system is operative to allow a user to select a desired look of a particular environment, process features from the particular environment corresponding with the desired look, and project an image onto the local environment corresponding to the desired look, whereby through use of the system, a user can alter the particular environment to look like a selected model.

Additionally, the system is configured to function as a sun burn detector. As a sun burn detector, the system is operative to detect areas of a user's skin that reflect ultra-violet light and project an image onto the area reflecting ultra-violet light, allowing a user to detect a presence of a sunburn.

In yet another aspect, the system is configured to function as an underwater terrain visualizer and is operative to detect a feature of the underwater terrain and project an image onto the feature.

Finally, the processor module is operative to receive an observation signal from an audio tracker, detect a sound in the observation signal, convert the sound to text, and generate an output signal based on the text, whereby the system detects and converts words and sounds into a text to be projected upon a surface. The system further comprises an audio tracker communicatively connected with the processor module for detecting and sampling an audio signal in the local environment, and for generating an observation signal based on the audio signal. A projection display module is located proximate the audio tracker and communicatively connected with the processor module for receiving the output signal and for projecting an image onto the surface.

BRIEF DESCRIPTION OF THE DRAWINGS

The objects, features and advantages of the present invention will be apparent from the following detailed descriptions of the various aspects of the invention in conjunction with reference to the following drawings, where:

FIG. 3A is an illustration of a daylight scene of a physical environment;

FIG. 3B is an illustration of an edge rendering (physical aspects) computed from the physical environment of FIG. 3A;

FIG. 3C is an illustration of edges rendered from FIG. 3B, being projected upon the physical environment of FIG. 3A during a reduced lighting situation, such as at night;

FIG. 3D is an illustration of a spotlight projected upon the physical environment of FIG. 3A, during a reduced lighting situation;

FIG. 9 is a table describing various aspects of the present invention.

DETAILED DESCRIPTION

Figure 1:
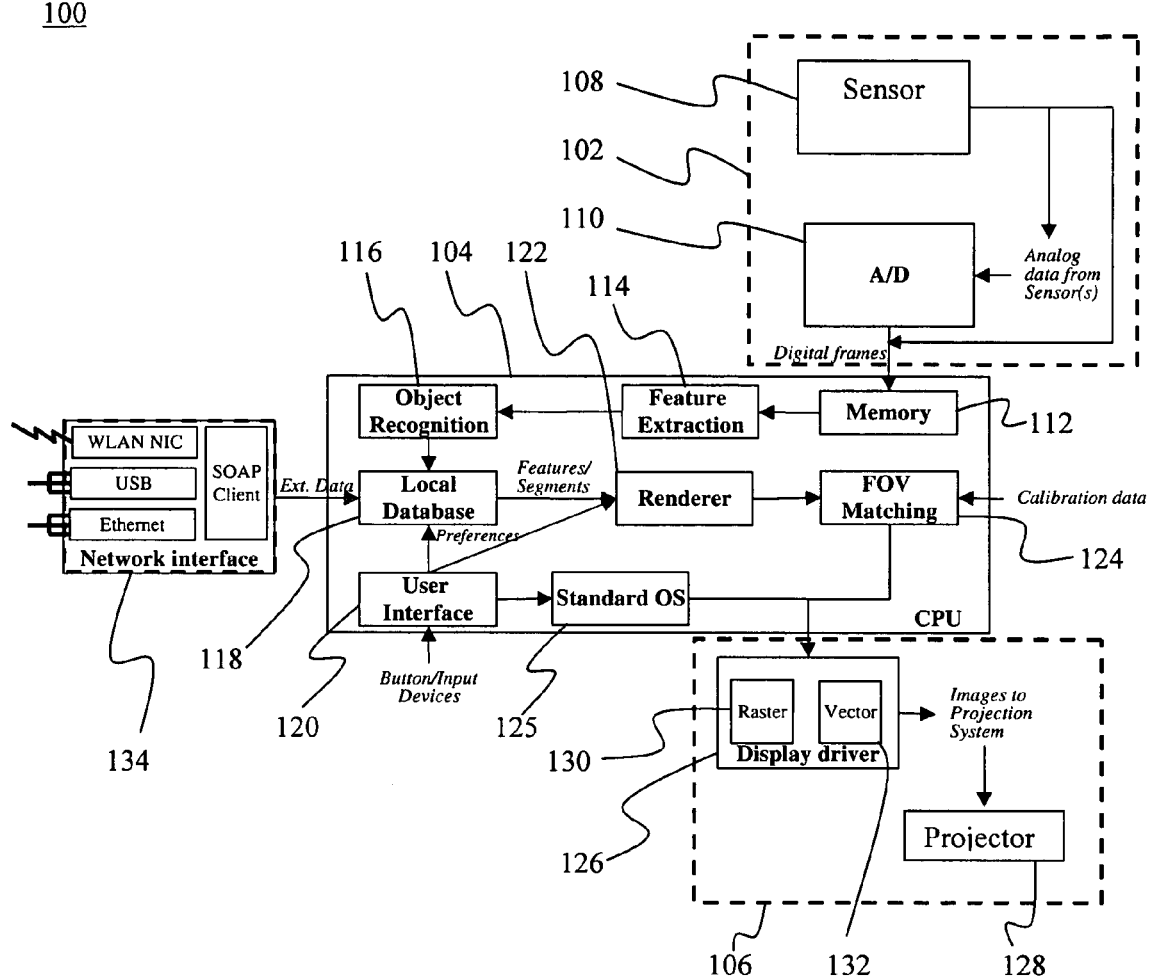
FIG. 1 is a flow chart illustrating a sensor module, a processor module, and a projection display module according to the present invention.

The present invention relates to enhanced perception lighting and, more particularly, to a system that allows a user to gather information from a physical environment and project that information back onto the physical environment in order to provide the user with an enhanced perception of the physical environment.

The following description, taken in conjunction with the referenced drawings and/or tables, is presented to enable one of ordinary skill in the art to make and use the invention. Various modifications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein. Furthermore, it should be noted that unless explicitly stated otherwise, the figures included herein are illustrated qualitatively and without any specific scale, and are intended to generally present the concept of the present invention.

In order to provide a working frame of reference, first an introduction is provided to provide the reader with a brief understanding of the present invention. Finally, a discussion of various aspects of the present invention is provided to give an understanding of the specific details.

(1) Introduction

The present invention combines sophisticated functionality of a sensor module, a processor and a projection display module as an Enhanced Perception Lighting (EPL) system. The features of a sensor-processor-projection display system that would enable enhanced perception in a user's environment have only recently become practical due to lower cost and higher performance products. For example, low cost night vision sensing is now being sold with vehicles and for use in fixed locations such as residential homes. Bright projection systems are still relatively expensive, but are gradually becoming less expensive and much smaller. Additionally, processor technology has improved dramatically. These three sub-system components together with novel processing algorithms enable a large variety of new applications that go significantly beyond the prior art.

The EPL system is a novel system for providing enhanced perception of an individual's local environment. At the simplest level, EPL consists of a sensor module, a processor module, and a projection display module connected via a network, bus cable or other means. EPL enables a user to see information not normally visible or to enhance degenerate information by first collecting sensor data, extracting information from the sensor data, and then using the extracted information to drive a display that projects the information onto the local environment of the user. For example, a simple embodiment of the invention is an intelligent flashlight that uses an infrared or low-light sensitive charge coupled device (CCD) to collect images in the direction a user points the flashlight, then a processor extracts features such as edges from the image in real time, which can then be used to project bright edges onto the physical edges in the world. The effect in this case is to highlight only regions of the space that contain edge information. Although the present application illustrates several embodiments of the present invention, it can be appreciated by one skilled in the art that many different sensors, processing systems and algorithms, and projection display alternatives supporting a variety of different embodiments in a range of applications are possible, many of which are described herein.

(2) Discussion

Enhanced Perception Lighting (EPL) is a system for providing people with enhanced perception in virtually any environment where traditional lighting systems can operate. As shown in FIG. 1, the EPL system 100 consists of three major sub-systems: a sensor module 102 for detecting and sampling a physical aspect from at least one point in a physical environment and for generating an observation signal based on the physical aspect; a processor module 104 with one or more sub-modules, for receiving the observation signal and generating an output signal based on the observation signal; and a projection display module 106 located proximate the sensor module 102 and communicatively connected with the processor module 104 for projecting a display onto the at least one point in the physical environment based upon the output signal. The EPL system 100 shown in FIG. 1 is not meant to be limiting, but serves as an illustrative example of an EPL system 100 with numerous sub-modules contained within the processor module 104. As can be appreciated by one skilled in the art, the processor module 104 may contain one, all, or any combination there-between of the illustrated sub-modules. Furthermore, as can be appreciated by one skilled in the art, the components of the EPL system 100 may be connected in any manner allowing for projection onto the at least one point in the physical environment. For example, the projection display module 106 and sensor module 102 may be located remotely, with the processor module 104 at another location.

Furthermore, the communicative connection and any other connection described herein may be through any technique or device for communicatively connecting one device with another, non-limiting examples of which include being wired and a wireless connection. In several configurations, it is important that the projection display module 106 be located proximate the sensor module 102 so that the projection display accurately reflects the physical aspect received by the sensor module 102. Together, the system 100 allows a user to gather information from the physical environment and project that information back onto the physical environment in order to provide the user with an enhanced perception of the physical environment.

The sensor module 102 is used to sense the physical environment and generate an observation signal. The sensor module 102 may be any suitable mechanism or device for sampling a physical aspect from the physical environment and generating an observation signal, non-limiting examples of which include a radiation (i.e. Geiger) sensor, an image sensor, a motion and ranging sensor, a Ultra wide-band radar, an X-ray sensor, an infrared sensor, a Magnetometer sensor, a chemical sensor, an Olfactory sensor, a low-light charge-coupled device (LLCCD) sensor, an image intensifier sensor, a charge-coupled device (CCD) sensor, an Ultra Violet sensor, an Audio sensor, a Sonar, a Radar, a Global Positioning Satellite, and a temperature sensor.

The observation signal is any applicable signal generated by a sensor device, such as an analog signal, and a digital signal. For example, in some aspects, the sensor module 102 produces a digital observation signal, whereas in other aspects, it may produce an analog observation signal. While any signal may be passed on to the processor module 104, it may be desirable in some cases to utilize a digital observation signal because of compatibility issues with the processor module 104. In such a case, the sensor module 102 may be all inclusive or may comprise a sensor 108 with a digitizer 110 for converting an analog signal received from the sensor 108 into a digital observation signal.

The sensor 108 is any suitable mechanism or device for sampling a physical aspect from the physical environment and generating an observation signal, non-limiting examples of which include a radiation (i.e. Geiger) sensor, an image sensor, a motion and ranging sensor, an Ultra wide-band radar, an X-ray sensor, an infrared sensor, a Magnetometer sensor, a chemical sensor, an Olfactory sensor, a low-light charge-coupled device (LLCCD) sensor, an image intensifier sensor, a charge-coupled device (CCD) sensor, an Ultra Violet sensor, an Audio sensor, a Sonar, a Radar, a Global Positioning Satellite, and a temperature sensor. The sensor 108 is used to collect images or single samples, with varying resolutions, accuracies, and update rates. For example, an infrared sensor might produce images of emissions at a particular wavelength, while sonar sensors might provide directions and approximate ranges to detected targets.

After an observation signal is generated, a processor module 104 receives the observation signal from sensor module 102 and generates an output signal. The processor module 104 includes at least one sub-module in order to generate the output signal. For example, the processor module 104 may include a single sub-module or several sub-modules in any combination there-between, depending on a particular configuration of the EPL system 100. The sub-module may be any suitable process or technique for receiving a signal and preparing the signal for projection as an image based upon data received from the sensor 108, non-limiting examples of which include a memory module 112, a feature extraction module 114, an object recognition module 116, a database module 118, a user interface module 120, a renderer module 122, and a field of view matching module 124.

The memory module 112 is any applicable technique for storing data and allowing for retrieval of the data. For example, the memory module 112 is used to store observation signals received from the sensor module 102. In this aspect, the memory module 112 stores recent imagery from the sensor(s) within indexed arrays in the processor module 104, possibly in compressed form, and thereafter allows the recent imagery to be retrieved for use with other sub-modules. A sample data structure would contain a header with information about a single digital frame such as size, time stamp, and color format (similar to standard image formats e.g. JPEG for compressed data or portable pixmap (PPM) for uncompressed data). Further, with additional processing, a memory function can perform a rapid comparison (normalized cross-correlation on sub-sampled pixels) of a new image with the last several images in order to reduce later stages of processing.

The feature extraction module 114 receives the observation signal directly from the sensor module 102 or from the memory module 112, and performs extraction of salient features from the observation signal with the goal of enhancing qualities of the observation signal, such as contrast, brightness, and transparency to improve visibility. This feature extraction module 114 includes a variety of low-level image processing functions such as edge detection, high-pass filtering in the Fourier domain, histogram equalization, homomorphic filtering, and physics-based quantitative models. Additionally, stages of feature extraction may include figure ground separation or segmentation (gray level or color). Four approaches to segmentation that can provide input to later recognition stages include those based on threshold techniques, edges, regions, and connectivity-preserving relaxation. For example, connectivity-preserving relaxation is a technique for finding outlines or edges by shrinking a form, such as a circle, around a desired feature or object until the form conforms with the edges of the desired feature or object.

In its simplest form, the feature extraction module 114 outputs an edge image that will be sent directly to the renderer module 122 for projection onto the world. Motion and depth information may also be extracted for later use. In some circumstances, it may be desirable to give priority to approaches that are amenable to real time implementation in embedded or widely available low cost hardware.

An object recognition module 116 may be included to apply techniques to features extracted from the observation signal to classify a type of object or to recognize a particular object. A large variety of techniques exist to perform object recognition. Several techniques of particular interest to EPL are model-based matching approaches, learning vector-quantization, support vector machines, and fusion classifiers. For example, one approach uses a feature vector consisting of the responses to filters at salient points in the imagery across multiple orientations, scales, and colors. The set of all feature vectors forms an index table that can be matched against using normalized cross correlation.

In order to store information on previously seen features or objects, a local database 118 may be included in the system 100. For example, the previously described index table may be stored in the local database 100 in order to speed up or alter the function of the EPL system 100. The index table above may be built internally to the system 100, supplied from an external interface such as through a wireless network where each region of space in the vicinity of the EPL device communicates to the device the objects that can be recognized, or interactively specified by a user. Supplying the database 118 externally has an advantage of limiting the size of the database needed to store the index table to only those objects that can be seen by the EPL sensor at any moment. External tracking information such as that obtained from global positioning satellite (GPS) or a video camera, or internal inertial measurement unit (IMU) tracking may also be used to further limit the search space during the matching process by providing an accurate estimate of location and orientation prior to matching. With sufficient bandwidth, the feature extraction and recognition processes (as well as rendering) can be bypassed to perform computation away from the device and send results back to the local database 118 for later rendering.

A user interface module 120 may be included in the system 100 to provide a variety of methods for controlling the processing of the system 100, as well as the sensor 108 and output choices. Functionality of the user interface 120 is provided through two primary modes: use of the system 100 in a computer screen mode with a window and menu-based interface by projecting onto an appropriate surface, or use of the buttons as preset modes for the device. Several controllable functions include, but are not limited to:

a. Controlling sensor modes such as integration time between a sensor, a processor, a projector, a frame rate, a resolution, and a field of view;
b. Selecting which features to extract;
c. Saving or recalling specific objects to/from the local database;
d. Enabling external communication;
e. Controlling multiple functions within the renderer (see description of a renderer module below);
f. Initiating auto-calibration; and
g. Controlling the display output and projection system.

Taking features and segments from the local database 118 and preparing them for projection by the display system may be completed with a renderer module 122. These features may be in the form of graphical modals (e.g. lines or triangles) or bit map images (e.g. edges). The renderer module 122 is any applicable mechanism or device for receiving and manipulating perceptual features. The renderer 122 is used to manipulate a variety of perceptual features to provide optimal enhancement to the user's local environment, non-limiting examples of which include:

a. Dark adaptation: Often, users will be night vision adapted. Therefore, providing a dark-adapted output (e.g. red light such as used by astronomers) will minimize loss of night vision.
b. Contrast enhancement: In some cases, the output should maximize the distinction between features of the environment that are desirable to see and those that are not (e.g. in security applications).
c. Stereoscopic depth: Depth perception requires surface and edge visual features to be visible, and is often reduced due to darkness. Virtual patterns projected onto real objects can enhance depth perception.
d. Projected feature size at distances: Given the perspective distortion and likely oblique angle of projection, features/objects at larger distances will require specific enhancements to make them more visible, such as increasing brightness (since brightness falls off as the square of the distance). The renderer 122 may also cut off projection at larger distances to avoid these issues and replace lost information in the foreground with cues to indicate its actual location.
e. Motion compensation: Rapidly moving objects are less visible to the human eye in both contrast and color. Enhanced contrast and color can improve motion detection and recognition by humans. Prediction of future motion can enable more accurate alignment with the actual location of the moving object.
f. Occluded Information Visualization: Use of combined cues is necessary to enable humans to unambiguously understand information that is occluded by intervening materials (e.g. walls, fog). These include perspective cut outs, transparency, motion, and depth.

A field of view (FOV) matching module 124 may be included to allow automatic calibration of the EPL system 100. The FOV module 124 enables accurate projection of information onto the environment to maximize registration of the input and output fields of view. This occurs by reversing the sense-process-project order and first projecting an imperceptible square pattern indicating the limits of the FOV onto the environment and then sensing this square with the input sensor 108 (or alternatively with a dedicated sensor). Limits of the FOV are then used to adjust the projection display module so the display matches the FOV. In the case where an optical sensor is used to image the user environment and an optical projector is used to display information, the sensor 108 will detect the projected image, which may lead to incorrect registration. To avoid this, optical notch filters with different wavelengths may be used in both the sensor 108 and projector display module 106, thus separating the input and output.

Although the invention can operate on a specialized operating system, it could be configured to use a standard operating system 125 as shown in the figure to add further adaptability to the invention. If in a software form, the present invention can be designed to operate on standard commercially available operating systems 125, or on a specialized operating systems.

The projection display module 106 is used to project a display onto the physical environment. The projection display module 106 may include both a display driver 126 and a projector 128. The display driver 126 may produce any suitable display, non-limiting examples of which include vector 130 and/or raster 132 displays. The term "vector" refers to an image created by a line or movement defined by its end points, or by the current position and one other point, whereas the term "raster" refers to a set of horizontal lines composed of pixels, used to form an image.

Depending on the application, one form of display may be more desirable than another form. For example, typical light projectors show a raster image. Such projectors have become much smaller and lighter in recent years, with ones as small as notebook personal computers (PC)s now available. However, with today's technology, light projectors of the size that can be comfortably worn on a person's head are not bright enough to work in ordinary lighting conditions.

Alternately, some applications may be better served by vector displays, such as when scanning the output across multiple lines. In this aspect, the projector 128 may be any projector capable of projecting a vector display, such as a scanned laser. For example, laser pointers the size of a pen are available that can illuminate a dot or small line on a surface. Such lasers are practical today for vehicle or environment mounted configurations, resulting in displays that draw graphics similar to what is seen in laser light shows in planetariums.

In some circumstances, it may be desirable to provide the processor module 104 with external data from another source, such as from an additional EPL system. In order to receive the external data, the EPL system 100 includes a network interface 134 communicatively connected with the processor module 104. The network interface 134 is any suitable interface, non-limiting examples of which include a USB port, an Ethernet port, and a wireless mechanism.

Furthermore, in cases where the EPL system 100 is installed at a fixed location and used to light a static scene (with no motion or change), the sensor module 102 is only required at setup and may be disconnected from the unit and used elsewhere. In setup mode, an image is acquired of the scene only one time and provides a mask for the projection display module 106 to highlight user defined or processed portions of the scene. Thus, the sensor module 102 can be used separately from the statically positioned processor module 104 and the projection display module 106.

(3) Various Aspects

The EPL system 100 of the present invention has numerous embodiments. The following discussion covers several of these embodiments and intends to give a broad but incomplete and non-limiting coverage while addressing features of the three sub-systems that are needed in general. The embodiments are illustrative and the features presented in the followed embodiments can be applied to a myriad of applications, not just the embodiments described herein.

A. Digital Camera, Projector, and a Personal Computer (PC)

Figure 2:
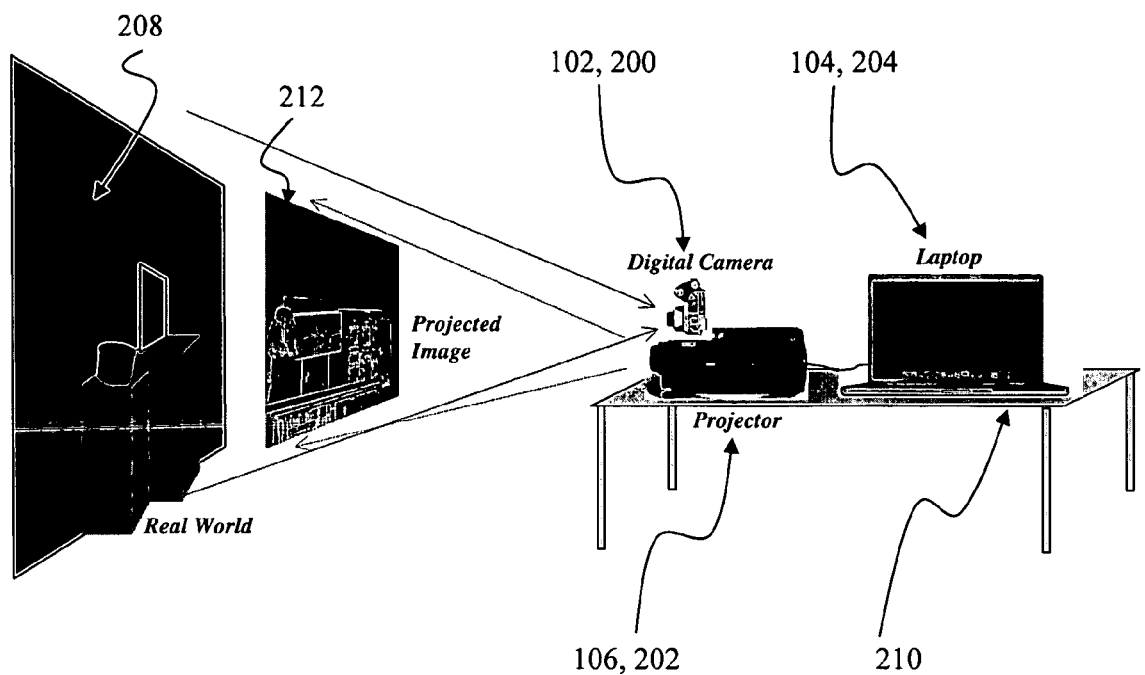
FIG. 2 is an illustration of an enhanced perception lighting system according to the present invention.

FIG. 2 is an illustration of a functional EPL system 100. As can be appreciated by one skilled in the art, the system 100 is not limited to the components shown in FIG. 2, as they are shown for illustrative purposes to demonstrate the functionality of the system 100. As shown in FIG. 2, the system 100 may simply comprise of a digital camera 200 (i.e. sensor module 102), a projector 202 (i.e. projection display module 106), and a PC 204 (i.e. processor module 104). In this implementation, a static image 208 is captured from the same viewpoint as the projector 202 using the digital camera 200. The image 208 is thereafter processed by the PC 204 for display. The PC 204 processes the image 208 in any suitable manner to prepare it for projection and display. For example, the PC 204 may extract features from the image 208 and highlight certain portions of the scene. After processing, the projector 202 projects the processed image 212 back upon the same surface where the camera 200 captured the static image 208, in registration with objects from the image 208. The processed image 212 may be in any wavelength, a non-limiting example of which includes being in the visible spectrum.

FIG. 3 illustrates results from using the system of FIG. 2. FIG. 3A illustrates an original scene at night time. Depending upon the application, the original scene can be in any suitable lighting or condition, non-limiting examples of which include daytime and nighttime. Shown in FIG. 3B is an edge image 300 after being captured by the system and processed. The edge image 300 is thereafter projected onto the same scene from where it was captured, as shown in FIG. 3C. In addition to outlining edges, the system may project any suitable image. For example, and as shown in FIG. 3D, a "spotlight" 302 may be projected onto a user defined portion of the scene at night.

Figures 4A, 4B:
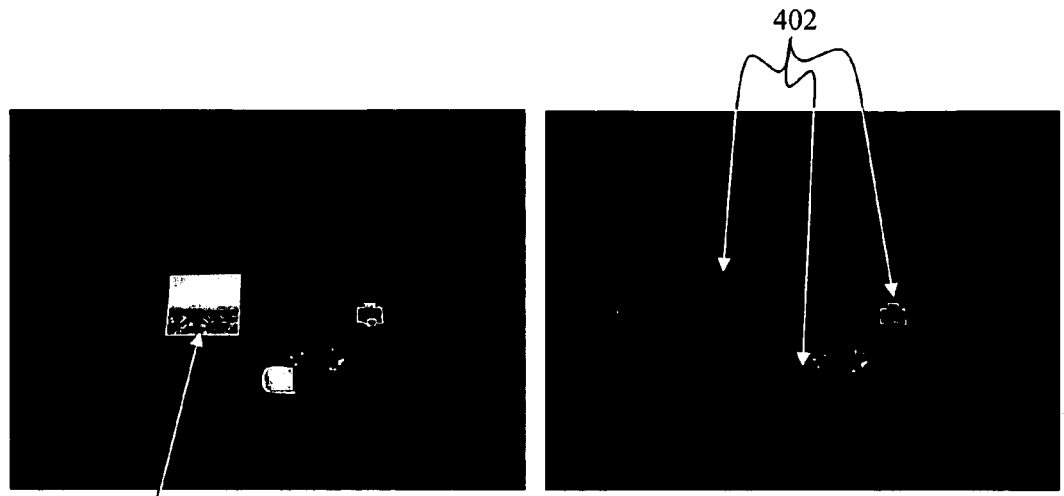
FIG. 4A is an illustration of a region-specific projection.
FIG. 4B is an illustration of a color-specific projection.

FIG. 4 shows object specific spotlights for further illustration of alternative forms of projection. In this configuration, instead of outlining an object, the system highlights one or more specific objects, functioning as an object specific spotlight. The spotlight may be in any suitable color and highlight any suitable shape. For example, FIG. 4A illustrates a white light 400 projected in registration onto real world objects, while FIG. 4B illustrates projection of colored lights 402.

B. Embodiment as a Flashlight

Figure 5:
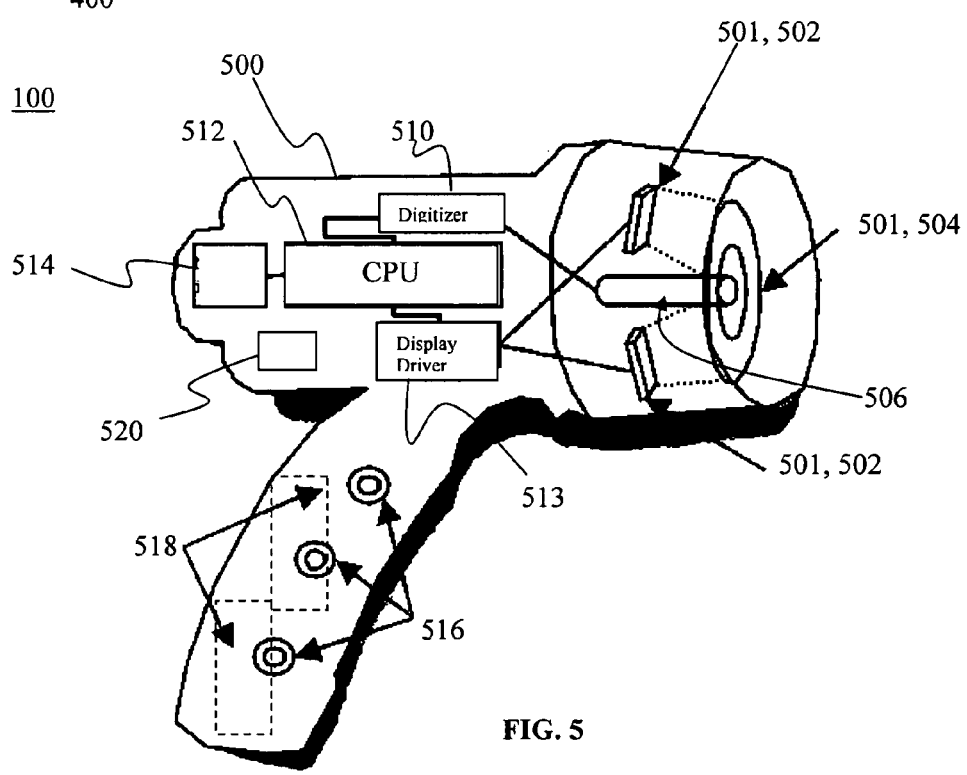
FIG. 5 is an illustration of an enhanced perception lighting system according to the present invention, embodied as a flashlight.

As shown in FIG. 5, the system 100 may also be in the form of a flashlight 500. In this case, the flashlight 500 consists of a projection system 501 composed of one or more miniature image sources 502 (such as a digital light projector (DLP) chip), a light source (not shown), and adjustable optics 504 to project the image to the local environment. Aligned with the projection optics 504 is a miniature sensor 506, such as an infrared sensor (or low-light CCD or complimentary metal oxide semiconductor (CMOS) imager). The sensor 506 may include its own optical system or possibly use the same optics as the projection system 501. It is important that the optical image from the sensor 506 be of the same field of view as the projection system 501 in order to simplify the process of registering data with the local environment (however, misalignment can be compensated, to a limited extent, in software within the FOV Matching function). When the sensor produces an analog signal as opposed to a digital signal, a digitizer 510 is included to receive analog data from the sensor 506 and digitize it into a digital image signal, which is thereafter fed into a computer processing unit (CPU) 512 in preparation for a display driver 513. Alternatively, the sensor 506 may provide digital data in a standard format (such as digital video (DV)) through an IEEE1394 port and into the CPU 512. For a detailed discussion of functions performed by the CPU 512, see FIG. 1 and the relevant discussion above.

Additionally, the flashlight 500 device may include a network interface 514. The network interface 514 can be used to obtain information from other peripherals through any suitable technique for transferring information, non-limiting examples of which include through wired (Ethernet), wireless (IEEE 802.11 or Bluetooth) networks. This Information may include specific data or pre-programmed user preferences of the local environment. Non-limiting examples of such user preferences may be color or brightness effects to use in that particular environment.

Furthermore, the flashlight 500 may include a control interface 516. The control interface 516 is any applicable control technique allowing a user to control the functionality of the system 100. As a non-limiting example, buttons may be used that are either switches or pointers, enabling designation and selection of different modes of operation of the flashlight 500, either through pre-programmed functions assigned to the buttons, or as selection buttons similar to a mouse when the flashlight projection display is used in a computer screen mode. In such a computer screen mode, a user can project an image of a standard window system and use the CPU 512 in a traditional manner (possibly connected to a USB keyboard as well).

In order to maintain power, the flash light 500 includes a power source 518. The power source 518 may be any suitable mechanism, device, or technique for providing power, non-limiting examples of which include rechargeable long life batteries, and an external plug. With a variety of power sources 518 available (i.e. miniaturized and mobile v. non-mobile), the flashlight can be used in a variety of settings, such as in the field.

In some circumstances, it may be desirable to track the flashlight's 500 position. Accordingly, an optional tracking mechanism 520 may be included for tracking the flashlight 500. The tracking mechanism 520 may be any suitable mechanism or device for tracking an object, non-limiting examples of which include external tracking systems that send the position and orientation of the flashlight 500 through the network interface 514, or through using embedded micro-IMU capability on the device. The tracking mechanism 520 enables the display of virtually any other kind of local information in registration with the local environment, similar to current augmented reality systems where a display is head worn and tracked rather than projected onto the surface of the local environment In another aspect, several flashlights 500 may be networked together to cooperatively light features in a local environment.

C. Embodiment as a Safety/Security Light

Infrared motion detectors are often used in commercial security lights to turn on floodlights when motion is detected. Such security systems typically use wide field of view (FOV), single detector approaches that do not capture an infrared (IR) image of the environment. They are also placed in a fixed location (typically attached to a wall or light post), and have no control over the lighting effects achieved.

Alternatively, imaging night vision cameras are often used for surveillance, but do not offer any form of projection display (e.g. Stealth 301 Camera from BE Meyers, or Infrared Inc. IR2100 wireless system). This particular EPL 100 embodiment uses a sensor module 102 mounted in place of the non-imaging IR detector. For example, a low cost, imaging infrared sensor may be used. Commercially available examples of such night vision sensors are the un-cooled focal plane array (UFPA) Imager, with 320×240 pixel resolution as produced by Raytheon Company, located at 870 Winter Street, Waltham, Mass. 02451-1449, and a small (2-inch cube) infrared imaging sensor with 320×240 resolution, produced by Irvine Sensors Corporation, located at 3001 Redhill Avenue, Building 3, Suite 108, Costa Mesa, Calif. 92626-4526. Additionally, Indigo Systems Corporation, located at 70 Castilian Dr., Goleta, Calif. 93117-3027, makes a small infrared sensor called Omega.

A projection display module 106 projects an image onto the environment. The projection display module 106 may be any suitable projection module, such as a small microdisplay projector with a resolution greater than the sensor module 102 and the same FOV, with a light output similar to that of a floodlight. A working example of a projection display module 106 is the PLUS V-108D, which is a two pound, small projector using Texas Instrument's DLP technology with 1024×768 pixel resolution and 800 lumens. Texas Instrument being located at 13532 N. Central Expressway, M/S 3807, Dallas, Tex. 75243-1108. For comparison, a typical 100 Watt floodlight produces about 1000 lumens.

Once the device is at a fixed location, the user may set up the functions of the device. As a non-limiting example, the temperature of regions of the environment can be monitored and illuminated in a color scale from red to blue (i.e. warmer to colder). More generally, temperature, motion, object type, and even object name can be monitored within specific regions through user specification. Since this type of system is installed in a fixed location, much of the processing needed to detect and render images can be placed on an off board computer and connected through any suitable connection technique, a non-limiting example of which includes using a wireless link with sufficient bandwidth to enable a 10 Hz update.

D. Car Headlight

Existing car headlights are fixed in position and typically offer two brightness levels (i.e. a high beam and a low beam). Prototype headlight systems have been constructed that enable a light beam to be steered around a curve in order to light a lane. Other intelligent headlights have been proposed that use projection systems to draw information from databases onto the road surface. Alternatively, night vision systems enable a driver to see beyond headlights using infrared video that is displayed on a heads-up display through a windshield. However, none of these solutions enable accurate registration of non-visible information with the driver's view.

Figure 6:
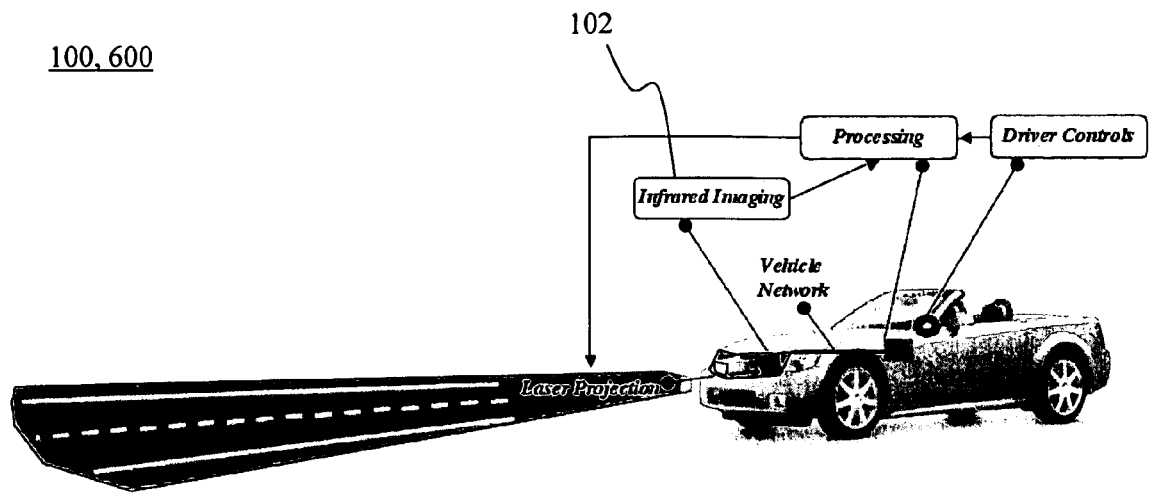
FIG. 6 is an illustration of an enhanced perception lighting system according to the present invention, embodied as intelligent car headlights.
Figure 7:
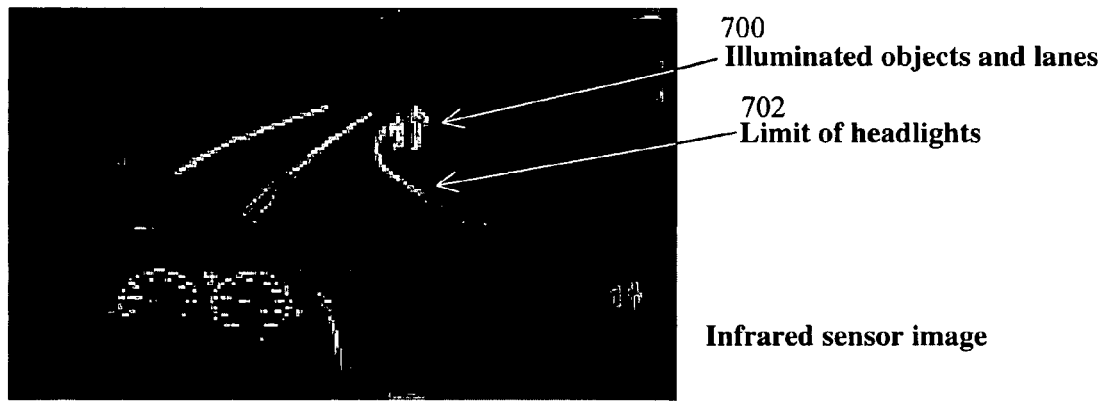
FIG. 7 is an illustration of an illuminated physical environment after being illuminated by intelligent car headlights.

The EPL 100 concept for EPL headlights 600 is shown in FIG. 6. The EPL headlights 600 show some similarities with the previously described flashlight system. In this particular aspect, the sensor module 102 may be any suitable mechanism or device for sensing a passing environment, a non-limiting example of which includes an infrared sensor manufactured by Raytheon Company. The sensor module 102 may be placed in any appropriate place to sense the environment, such as being mounted in the front grill as is the case in the night vision system produced by Cadillac, located at P.O. Box 33169, Detroit, Mich. 48232-5169. Feature extraction and object recognition functions can be utilized to process the input imagery to find desired criteria, such as road edges and obstacles. The desired criteria are thereafter passed to a projection display module 106, such as a vector laser projection system mounted in the front of the vehicle (coincident with the sensor). As shown in FIG. 7, when a laser is used, the laser projection system projects a laser beam onto the desired criteria, such as the road edges 702 and obstacles 700.

Vector laser projection has a few advantages over a raster image projected from a reflective or transmissive projection system. One of the most notable advantages is the increased brightness over a longer range, far surpassing projection limits of traditional headlights.

Increased brightness however can create concerns about potential eye damage resulting from a laser beam passing across an eye of an individual. Such concerns can be overcome however because the laser can be made eye safe for oncoming drivers and pedestrians since it does not dwell long enough to exceed regulations. Further, with adequate recognition capability, the laser projection system will only draw imagery on the surface of objects and not on the windshield of oncoming vehicles.

Special rendering may be required to deal with occlusion conditions such as fog or heavy rain. When occlusion becomes an issue, an infra sensor may provide imagery that can be used to detect objects beyond the driver's perception, thereby aiding the driver's ability to cope with reduced visibility. The projection display module 106 (e.g. laser projection system) will effectively draw on a surface of the fog rather than the road surface, causing increased light scatter and reducing the resolution of the projection. In these cases, it is important to limit and control the scatter. For example, in fog the laser projection system can be used to show the right road edge by projecting a planar "sheet" of light in the correct location. A road obstacle can be depicted using any indicator, such as a red dot being projected at the location of the obstacle.

E. Surface Temperature Imager

Figure 8:
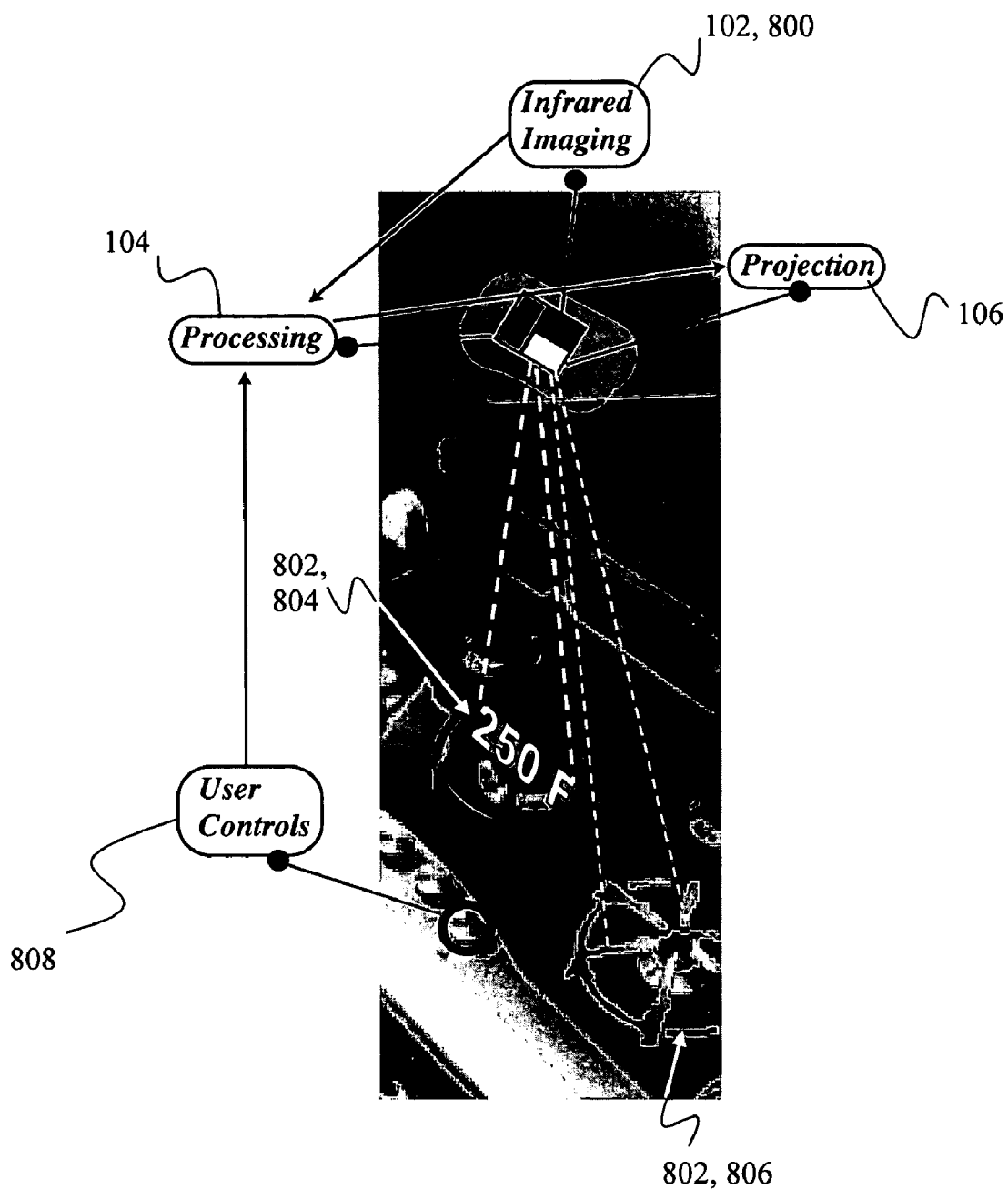
FIG. 8 is an illustration of an enhanced perception lighting system according to the present invention, embodied as a surface temperature sensor and warning system.

Across a range of civilian and industrial uses, from civilian stove-tops to industrial welding or mechanic work, people interact with surfaces that retain enough heat to cause serious burns but do not show any visual signs of being heated. Existing temperature probes must be placed in the environment and are extremely limited in the spatial range they measure, such as point sensors like thermometers. Conventional thermometers are active, requiring intent and deliberation on the part of the user. FIG. 8 illustrates an example of an EPL system 100 using an infrared imaging sensor 800 to gather temperature information. Once placed in the workplace or above a surface 802, the EPL system 100 operates to visually remind the user that the surface 802 is heated, even if they forgot to measure the surface 802 temperature. In this particular aspect, the EPL system 100 senses a temperature from the surface 802 (e.g. a stove top) and projects an image onto the surface 802, where the image indicates its temperature. The image projected can be as simple as a written temperature 804, or projected across an entire surface 806, specifying exactly which portions of the surface 802 are hot and which are safe to interact with (i.e. touch). Furthermore, the image can be in a plurality of colors, each color indicative of a particular temperature, non-limiting examples of which include a red image being indicative of a hot surface 802, a yellow image being indicative of a warm surface 802, and a blue image being indicative of a cool surface 802.

As can be appreciated by one in the art, the surface 802 is not limited to stovetops and can be measured in a variety of applications. For example, other application domains include interaction with ceramics (e.g. a kiln), engine parts, mechanical devices such as high-speed drills or saws, water pipes, or with very cold surfaces such as cooled gases or conductive containers of hot or cold materials. Such a system 100 would consist of all three modules, including a sensor module 102 (e.g. a spatial infrared imaging sensor), processor module 104, and projection display module 106 that could project colored light or numeric values of temperatures in registration with the surface. A user control 808 is added to allow a user to set the temperature at which an image will be projected onto the surface 802.

E. Predictive Lighting

Predictive lighting is an invention that allows a user to project a sophisticated model onto a surface so a user can perform "what if" analysis on a variety of choices. For example, a makeup light used in front of a mirror can be set to remember a specific state and then used as a model for future comparison. Or alternatively, such a device can be used to determine entirely new states (e.g. blond hair instead of brown) by projecting light in the proper wavelength and brightness onto the desired surface. Using the hair color example, light can be projected onto a user's head to give the user an appearance of being a blond haired individual instead of a brown haired individual. As was the case in all of the previously discussed embodiments, a predictive lighting system would necessarily need a processor model that would be configured to utilize sensor module and a projection display module.

F. Additional Embodiments

The above named embodiments are for illustrative purposes and not meant to be limiting. The EPL system of the present invention can be applied to a myriad of uses, as shown in FIG. 9. The first column, labeled "Function," includes a non-exhaustive list of uses for the EPL system of the present invention. The second column, entitled "Sensor," includes a non-limiting list of sensors that would ideally work with the previously identified functions. Additionally, the third column, entitled "Processor," includes a non-limiting list of processors that would work with the previously identified functions. Furthermore, the fourth column, entitled "Display," includes a corresponding, non-limiting list of display types. Finally, the last column, labeled "Notes," includes notes further elaborating on the corresponding function.

What is claimed is:

1. An enhanced perception lighting system for providing enhanced perception of a user's physical environment, comprising a processor module configured to receive an observation signal from a sensor module that detects and samples a physical aspect from at least one point in a physical environment, the processor module operative to gather information about the physical aspect at the at least one point and generate an output signal based on the physical aspect, the processor module being further configured to be communicatively connected with a projection display module for projecting a display onto the at least one point in the physical environment based upon the output signal, whereby the system allows a user to gather information from the physical environment and project that information back onto the physical environment in order to provide the user with an enhanced perception of the physical environment.

2. An enhanced perception lighting system as set forth in claim 1, further comprising a sensor module communicatively connected with the processor module for detecting and sampling a physical aspect from at least one point in a physical environment and for generating an observation signal based on the physical aspect.

3. An enhanced perception lighting system as set forth in claim 2, further comprising a projection display module communicatively connected with the processor module for projecting a display onto the at least one point in the physical environment based upon the output signal.

4. An enhanced perception lighting system as set forth in claim 2, further comprising a projection display module located proximate the sensor module and communicatively connected with the processor module for projecting a display onto the at least one point in the physical environment based upon the output signal.

5. An enhanced perception lighting system as set forth in claim 4, wherein the sensor module further includes a digitizer for receiving analog data from a sensor and digitizing it into an image as the observation signal, which is thereafter fed into the processor module.

6. An enhanced perception lighting system as set forth in claim 5, wherein the sensor module is an item selected from a group consisting of a radiation sensor, an image sensor, a motion and ranging sensor, a Ultra wide-band radar, an X-ray sensor, an infrared sensor, a Magnetometer sensor, a chemical sensor, an Olfactory sensor, a low-light charge-coupled device (LLCCD) sensor, a image intensifier sensor, a charge-coupled device (CCD) sensor, an Ultra Violet sensor, an Audio sensor, a Sonar, a Radar, a Global Positioning Satellite, and a temperature sensor.

7. An enhanced perception lighting system as set forth in claim 6, wherein the processor module further includes a memory module for storing an observation signal received from the sensor module.

8. An enhanced perception lighting system as set forth in claim 7, wherein the processor module further includes a feature extraction module for extracting salient features from the observation signal, whereby extracting the salient features enhances qualities of the observation signal, such as contrast, brightness and transparency.

9. An enhanced perception lighting system as set forth in claim 8, wherein the feature extraction module is configured to perform at least one image processing function.

10. An enhanced perception lighting system as set forth in claim 9, wherein the at least one image processing function is a function selected from a group consisting of edge detection, high pass filtering in the Fourier domain, histogram equalization, homomorphic filtering, physics-based quantitative models, and figure ground segmentation.

11. An enhanced perception lighting system as set forth in claim 10, wherein the figure ground segmentation is a technique selected from a group consisting of threshold, edges, regions, and connectivity preserving relaxation.

12. An enhanced perception lighting system as set forth in claim 11, wherein the processor module further includes an object recognition module for classifying an object present in the observation signal.

13. An enhanced perception lighting system as set forth in claim 12, wherein the object recognition module is configured to employ a technique selected from a group consisting of a model-based matching approach, learning vector-quantization, support vector machines, and fusion classifiers.

14. An enhanced perception lighting system as set forth in claim 13, wherein the processor module further includes a database module for storing information related to the observation signal in order to enhance functionality of the system.

15. An enhanced perception lighting system as set forth in claim 14, wherein the processor module further includes a user interface module communicatively connected with the system for allowing a user to control the system.

16. An enhanced perception lighting system as set forth in claim 15, wherein the processor module further includes a renderer module for preparing information related to the observation signal as an output signal for projection by the projection display module.

17. An enhanced perception lighting system as set forth in claim 16, wherein the renderer module is configured to prepare at least one perceptual feature from a list consisting of dark adaptation, contract enhancement, stereoscopic depth, projected feature size at distances, motion compensation, and occluded information visualization.

18. An enhanced perception lighting system as set forth in claim 17, wherein the processor module further includes a Field of View matching module for calibrating the system to enable accurate projection of information onto the environment to maximize registration of input and output fields of view.

19. An enhanced perception lighting system as set forth in claim 18, wherein the display projected by the projection display module is a display selected from a group consisting of vector and raster.

20. An enhanced perception lighting system as set forth in claim 19, further comprising a network interface communicatively attached with the processor module, allowing the system to be communicatively connected with other devices.

21. An enhanced perception lighting system as set forth in claim 1, wherein the processor module is configured to receive an observation signal from an X-ray sensor, the processor module operative to detect an object within a container and to generate an output signal based upon a location of the object within the container, whereby the system is configured to allow a user to point a device incorporating the system at a container, sense an object within the container and project onto an exterior surface of the container an image portraying the object within the container.

22. An enhanced perception lighting system as set forth in claim 21, further comprising an X-ray sensor communicatively connected with the processor module for detecting and sampling the object within the container, and for generating an observation signal based on the object.

23. An enhanced perception lighting system as set forth in claim 22, further comprising a projection display module located proximate the X-ray sensor and communicatively connected with the processor module for receiving the output signal and projecting a display onto the exterior surface of the container.

24. An enhanced perception lighting system as set forth in claim 1, wherein the processor module is configured to receive an observation signal from a thermal sensor and function as a surface temperature imager, the processor module operative to receive a user's preferred temperature limit, detect a surface temperature, and generate an output signal that is reflective of the surface temperature when the surface temperature exceeds a user's preset temperature limit, whereby the system is configured to allow a user to project a surface's temperature upon the surface.

25. An enhanced perception lighting system as set forth in claim 24, further comprising a thermal sensor communicatively connected with the processor module for detecting and sampling a surface temperature from at least one point on the surface, and for generating an observation signal based on the surface temperature.

26. An enhanced perception lighting system as set forth in claim 25, further comprising a projection display module located proximate the thermal sensor and communicatively connected with the processor module for receiving the output signal and projecting a display onto the at least one point on the surface based upon the output signal.

27. An enhanced perception lighting system as set forth in claim 26, wherein the projection display module includes a plurality of display colors and is configured so that the display is projected in a plurality of colors, each color indicative of a particular temperature.

28. An enhanced perception lighting system as set forth in claim 1, wherein the processor module is configured to receive an observation signal from a magnetometer and function as an in-wall wire detector, the processor module operative to detect a location of a wire behind a wall surface and generate an output signal that is reflective of the location of the wire, whereby a user may point the device at a wall surface and project upon the wall surface an image at a location of a wire detected behind the surface.

29. An enhanced perception lighting system as set forth in claim 28, further comprising a magnetometer communicatively connected with the processor module for detecting and sampling the location of a wire, and for generating an observation signal based on the location.

30. An enhanced perception lighting system as set forth in claim 29, further comprising a projection display module located proximate the magnetometer and communicatively connected with the processor module for projecting a display onto the wall surface at the location of the wire.

31. An enhanced perception lighting system as set forth in claim 1, wherein the processor module is configured to receive an observation signal from a chemical sensor and function as a chemical localizer, the processor module operative to detect a source of a chemical and generate an output signal reflective of the source, allowing a user to locate a chemical and project an image on the source of the chemical.

32. An enhanced perception lighting system as set forth in claim 31, further comprising a chemical sensor communicatively connected with the processor module for detecting and sampling a chemical, and for generating an observation signal based on the chemical.

33. An enhanced perception lighting system as set forth in claim 32, further comprising a projection display module located proximate the chemical sensor and communicatively connected with the processor module for projecting an image onto the source of the chemical.

34. An enhanced perception lighting system as set forth in claim 1, wherein the processor module is configured to receive an observation signal from a sensor selected from a group consisting of an infrared sensor, a low-light charge-coupled device sensor, a motion sensor, a ultra-violet sensor, a charge-coupled device sensor, a global positioning satellite, a sonar, a radar, and a image intensifier sensor, the processor module operative to detect a feature in a local environment and generate an output signal based upon a location of the feature, whereby the system allows a user to locate and illuminate a feature in a local environment.

35. An enhanced perception lighting system as set forth in claim 34, further comprising a sensor selected from a group consisting of an infrared sensor, a low-light charge-coupled device sensor, a motion sensor, a ultra-violet sensor, a charge-coupled device sensor, a global positioning satellite, a sonar, a radar, and a image intensifier sensor, the sensor communicatively connected with the processor module for detecting and sampling a feature in the local environment, and for generating an observation signal based on the feature.

36. An enhanced perception lighting system as set forth in claim 35, further comprising a projection display module located proximate the sensor and communicatively connected with the processor module for receiving the output signal and for projecting an image onto the feature.

37. An enhanced perception lighting system as set forth in claim 36, wherein the system is configured to function as a street lamp, the system being operative to illuminate a feature proximate a pedestrian.

38. An enhanced perception lighting system as set forth in claim 36, wherein the system is configured to function as indoor lighting, the system being operative to illuminate indoor, pre-designated features.

39. An enhanced perception lighting system as set forth in claim 36, wherein the system is configured to function as an outdoor security light, the system being operative to pinpoint and illuminate moving objects within a range of view of the security light.

40. An enhanced perception lighting system as set forth in claim 36, wherein the system is configured to function as predictive lighting, the system being operative to allow a user to select a desired look of a particular environment, process features from the particular environment corresponding with the desired look, and project an image onto the local environment corresponding to the desired look, whereby through use of the system, a user can alter the particular environment to look like a selected model.

41. An enhanced perception lighting system as set forth in claim 36, wherein the system is configured to function as a sun burn detector, the system being operative to detect areas of a user's skin that reflect ultra-violet light and project an image onto the area reflecting ultra-violet light, allowing a user to detect a presence of a sunburn.

42. An enhanced perception lighting system as set forth in claim 36, wherein the system is configured to function as an underwater terrain visualizer, the system being operative to detect a feature of an underwater terrain and project an image onto the feature.

43. An enhanced perception lighting system as set forth in claim 36, wherein the system is configured to function as a handheld flashlight, allowing a user to point the handheld flashlight and illuminate the feature.

44. An enhanced perception lighting system as set forth in claim 36, wherein system is incorporated into a vehicle and is configured to function as a car's headlight.

45. An enhanced perception lighting system as set forth in claim 1, wherein the processor module is operative to receive an observation signal from an audio tracker, detect a sound in a observation signal, convert the sound to text, and generate an output signal based on the text, whereby the system detects and converts words and sounds into a text to be projected upon a surface.

46. An enhanced perception lighting system as set forth in claim 45, further comprising an audio tracker communicatively connected with the processor module for detecting and sampling an audio signal in the local environment, and for generating an observation signal based on the audio signal.

47. An enhanced perception lighting system as set forth in claim 46, further comprising a projection display module located proximate the audio tracker and communicatively connected with the processor module for receiving the output signal and for projecting an image onto a surface.

48. An enhanced perception lighting system as set forth in claim 1, wherein the sensor module is an item selected from a group consisting of a radiation sensor, an image sensor, a motion and ranging sensor, a Ultra wide-band radar, an X-ray sensor, an infrared sensor, a Magnetometer sensor, a chemical sensor, an Olfactory sensor, a low-light charge-coupled device (LLCCD) sensor, a image intensifier sensor, a charge-coupled device (CCD) sensor, an Ultra Violet sensor, an Audio sensor, a Sonar, a Radar, a Global Positioning Satellite, and a temperature sensor.

49. An enhanced perception lighting system as set forth in claim 1, wherein the processor module further includes a memory module for storing an observation signal received from the sensor module.

50. An enhanced perception lighting system as set forth in claim 1, wherein the processor module further includes a feature extraction module for extracting salient features from the observation signal, whereby extracting the salient features enhances qualities of the observation signal, such as contrast, brightness and transparency.

51. An enhanced perception lighting system as set forth in claim 50, wherein the feature extraction module includes at least one image processing function.

52. An enhanced perception lighting system as set forth in claim 51, wherein the at least one image processing function is a function selected from a group consisting of edge detection, high pass filtering in the Fourier domain, histogram equalization, homomorphic filtering, physics-based quantitative models, and figure ground segmentation.

53. An enhanced perception lighting system as set forth in claim 52, wherein the figure ground segmentation is a technique selected from a group consisting of threshold, edges, regions, and connectivity preserving relaxation.

54. An enhanced perception lighting system as set forth in claim 1, wherein the processor module further includes an object recognition module for classifying an object present in the observation signal.

55. An enhanced perception lighting system as set forth in claim 54, wherein the object recognition module employs a technique selected from a group consisting of a model-based matching approach, learning vector-quantization, support vector machines, and fusion classifiers.

56. An enhanced perception lighting system as set forth in claim 1, wherein the processor module further includes a database module for storing information related to the observation signal in order to enhance functionality of the system.

57. An enhanced perception lighting system as set forth in claim 1, wherein the processor module further includes a user interface module communicatively connected with the system for allowing a user to control the system.

58. An enhanced perception lighting system as set forth in claim 1, wherein the processor module further includes a renderer module for preparing information related to the observation signal as an output signal for projection by the projection display module.

59. An enhanced perception lighting system as set forth in claim 58, wherein the renderer module prepares at least one perceptual feature from a list consisting of dark adaptation, contract enhancement, stereoscopic depth, projected feature size at distances, motion compensation, and occluded information visualization.

60. An enhanced perception lighting system as set forth in claim 1, wherein the processor module further includes a Field of View matching module for calibrating the system to enable accurate projection of information onto the environment to maximize registration of input and output fields of view.

61. An enhanced perception lighting system as set forth in claim 1, wherein the display projected by the projection display module is a display selected from a group consisting of vector and raster.

62. An enhanced perception lighting system as set forth in claim 1, further comprising a network interface allowing the system to be communicatively connected with other devices.

* * * * *